(12) United States Patent
Lahtinen (10) Patent No.: US 9,926,617 B2
(45) Date of Patent: Mar. 27, 2018

(54) METHOD FOR PRODUCING MATTE OR CRUDE METAL IN A SUSPENSION SMELTING FURNACE AND SUSPENSION SMELTING FURNACE

(71) Applicant: Outotec (Finland) Oy, Espoo (FI)

(72) Inventor: Markku Lahtinen, Espoo (FI)

(73) Assignee: OUTOTEC (FINLAND) OY, Espoo (FI)

( * ) Notice: Subject to any disclaimer, the term of this patent is extended or adjusted under 35 U.S.C. 154(b) by 193 days.

(21) Appl. No.: 14/650,527

(22) PCT Filed: Dec. 10, 2013

(86) PCT No.: PCT/FI2013/051149
§ 371 (c)(1),
(2) Date: Jun. 8, 2015

(87) PCT Pub. No.: WO2014/091077
PCT Pub. Date: Jun. 19, 2014

(65) Prior Publication Data
US 2015/0315673 A1  Nov. 5, 2015

(30) Foreign Application Priority Data

Dec. 11, 2012 (FI) .................................. 20126291

(51) Int. Cl.
*F27D 3/14* (2006.01)
*F27B 15/09* (2006.01)
(Continued)

(52) U.S. Cl.
CPC .................. *C22B 5/08* (2013.01); *C22B 5/02* (2013.01); *C22B 15/0047* (2013.01);
(Continued)

(58) Field of Classification Search
CPC ................................... F27D 15/09; F27B 3/14
See application file for complete search history.

(56) References Cited

U.S. PATENT DOCUMENTS 4,281,821 A * 8/1981 Kawazoe .............. C01B 17/765
266/144
5,662,730 A   9/1997 Akagi et al.
(Continued)

FOREIGN PATENT DOCUMENTS

EP    0499956 A1   8/1992
GB    1 243 568 A  8/1971
(Continued)

OTHER PUBLICATIONS

Office Action issued by the Korean Patent Office in corresponding Korean Patent Application No. 10-2015-7015891 on Jan. 18, 2017 (24 pages including partial English translation).
(Continued)

*Primary Examiner* — George Wyszomierski
*Assistant Examiner* — Tima M McGuthry-Banks
(74) *Attorney, Agent, or Firm* — Buchanan, Ingersoll & Rooney PC (57) ABSTRACT

A method is provided for producing matte such as copper or nickel matte or crude metal such as blister copper in a suspension smelting furnace such as a flash smelting furnace or a flash converting furnace. Also provided is a suspension smelting furnace such as a flash smelting furnace or a flash converting furnace. The suspension smelting furnace comprises a reaction shaft, a settler in communication with a lower end of the reaction shaft, and an uptake shaft. The settler extending in two opposite directions from a landing zone for a jet of oxidized suspension below the reaction shaft in the settler so that the settler comprises a first settler part
(Continued)

on a first side of the landing zone and a second settler part on an opposite second side of the landing zone.

11 Claims, 5 Drawing Sheets

(51) Int. Cl.
  *C22B 5/08* (2006.01)
  *C22B 23/02* (2006.01)
  *C22B 5/02* (2006.01)
  *C22B 15/00* (2006.01)
(52) U.S. Cl.
  CPC ............ *C22B 23/025* (2013.01); *F27B 15/09* (2013.01); *F27D 3/14* (2013.01)

(56) References Cited

U.S. PATENT DOCUMENTS

| | | |
|---|---|---|
| 5,912,401 A | 6/1999 | Fujii et al. |
| 6,241,798 B1 | 6/2001 | Dimitrov et al. |
| 6,436,169 B2 | 8/2002 | Hirai et al. |

FOREIGN PATENT DOCUMENTS

| | | |
|---|---|---|
| GB | 2 161 835 A | 1/1986 |
| JP | 2000-80420 A | 3/2000 |
| WO | WO 00/70104 A1 | 11/2000 |
| WO | WO 02/14765 A1 | 2/2002 |

OTHER PUBLICATIONS

International Search Report (PCT/ISA/210) dated Feb. 14, 2014, by the Finnish Patent Office as the International Searching Authority for International Application No. PCT/FI2013/051149.

International Preliminary Report on Patentability (PCT/IPEA/409) dated Dec. 5, 2014, by the Finnish Patent Office as the International Searching Authority for International Application No. PCT/FI2013/051149.

Extended Search Report issued by the European Patent Office in corresponding European Patent Application No. 13863632.9 on Jun. 13, 2016 (8 pages).

* cited by examiner

METHOD FOR PRODUCING MATTE OR CRUDE METAL IN A SUSPENSION SMELTING FURNACE AND SUSPENSION SMELTING FURNACE

FIELD OF THE INVENTION

The invention relates to a method for producing matte such as copper matte or nickel matter or crude metal such as blister copper in a suspension smelting furnace such as a flash smelting furnace or a flash converting furnace, wherein the method comprising step for feeding sulfidic raw material containing metal, slag-forming agent and oxygen containing reaction gas by means of a concentrate burner into a reaction shaft of the suspension smelting furnace to form a jet of oxidized suspension in the reaction shaft, receiving the jet of oxidized suspension in a landing zone of a settler in communication with a lower end of the reaction shaft, wherein the settler having an inner space, forming a layer of matte or crude metal and a layer of slag on top of the layer of matte or crude metal in the inner space of the settler, leading process gases from the suspension smelting furnace via an uptake shaft, wherein the uptake shaft has a lower end in communication with the settler, discharging slag from the layer of slag in the settler through a first taphole, and discharging matte or crude metal from the layer of matte or crude metal in the settler through a second taphole, wherein the first taphole is arranged in the vertical direction at a level above the second taphole.

The invention also relates to a suspension smelting furnace such as a flash smelting furnace or a flash converting furnace, wherein the suspension smelting furnace comprising a reaction shaft provided with a concentrate burner for feeding sulfidic raw material containing metal, slag-forming agent and oxygen containing reaction gas into the reaction shaft to form a jet of oxidized suspension in the reaction shaft, a settler in communication with a lower end of the reaction shaft, wherein the settler comprises an inner space and wherein a landing zone for the jet of oxidized suspension is formed in the inner space of the settler below the lower end of the reaction shaft and wherein the settler is configured to receive oxidized suspension from the reaction shaft at the landing zone and to form a layer of matte or crude metal and a layer of slag on top of the layer of matte or crude metal in the inner space of the settler, an uptake shaft for leading process gases from the suspension smelting furnace via the uptake shaft, wherein the uptake shaft has a lower end in communication with the settler, a first taphole for discharging slag from the layer of slag in the inner space of the settler, and a second taphole for discharging matte or crude metal from the layer of matte or crude metal in the inner space of the settler, wherein the first taphole is arranged in the vertical direction at a level above the second taphole.

Matte refers in this context for example to copper matte or nickel matte.

Crude metal refers in this context for example to blister copper

Suspension smelting furnace refers in this context for example to a flash smelting furnace for producing matte such as copper matte or nickel matte, or to a flash converting furnace for processing copper matte to produce blister copper.

A known problem in suspension smelting furnaces is the formation of magnetite ($Fe_3O_4$) in the layer of slag which increases the viscosity of the slag. This increased viscosity slows down the separation of particles containing the metal to be recovered in the suspension smelting process and contained in the layer of slag by settling into the layer of matte or crude metal beneath the layer of slag. For example in a suspension smelting process for smelting sulfidic copper concentrate, copper will in the layer of slag, that is formed in the settler, be bound to oxygen in the form of copperoxide ($Cu_2O$) and be bound sulfur in the form of copperdisulfide ($Cu_2S$). For process economic reasons it is desirable that the copper content in the slag that is discharged from the layer of slag is as low as possible. This concerns especially copperoxide, because recovering of copperoxide in a slag flotation process following a suspension smelting process is not good.

Different solutions to this known problem are presented in various publications.

U.S. Pat. No. 5,662,730 presents a solution, in a flash smelting method of copper, where a carbonaceous material, whose grain size is under 100 um and is in a proportion of 65% or more, and whose grain size is from 44 to 100 µm and is in a proportion of 25% or more, and which has 80% or more of a fixed carbon content, is charged into a reaction shaft of a flash smelting furnace. It is possible to prevent the excessive formation and excessive reduction of $Fe_3O_4$ in the slag.

U.S. Pat. No. 5,912,401 presents to a pyrometallurgical smelting method of copper, the copper-ore and auxiliary fuel, such as carbonaceous material, is blown through an ore-concentrate burner into a reaction shaft. In an improved pyrometallurgical smelting of copper, the carbonaceous material is used to reduce the $Fe_3O_4$ contained in the slag. The present invention provides an improved method for reducing the $Fe_3O_4$ even in a case at a decreased amount of auxiliary fuel is to be decreased. The carbonaceous material is blown into a lower portion of the reaction shaft where the oxygen partial pressure is low.

WO 00/70104 relates to a method, whereby the non-ferrous metal content of the slag generated in the production of non-ferrous metals such as copper or nickel in a suspension smelting furnace is reduced by charging metallurgical coke, with a size ranging from 1-25 mm, into the furnace. Baffles can be positioned from the roof of the furnace downwards, by means of which small particles containing copper and nickel are prevented from drifting to the back of the furnace and being tapped with the slag. The baffles force the small particles to settle in the reduction zone of the furnace.

U.S. Pat. No. 6,436,169 presents a method of operating a copper smelting furnace, wherein a ferrous substance containing more than 80 wt. % metallic iron having a specific gravity of 3.0-8.0 and particle diameter of 0.3-15 mm is added to copper smelting slag containing Fe having an oxidation-reduction number of 3+ and to the $Fe_3O_4$ in the intermediate layer, thereby deoxidizing the $Fe_3O_4$ to FeO, the method reduces the $Fe_3O_4$ within the layer of slag and the $Fe_3O_4$ generated in the intermediate layer between the layer of slag and the matte layer. So that their viscosity is reduced and separation rate is increased, thus increasing the yield rate of useful metal, and the problems that originate in the intermediate layer are eliminated.

OBJECTIVE OF THE INVENTION

An object of the invention is to provide a method for producing matte or crude metal in a suspension smelting furnace such as in a flash smelting furnace or in a flash converting furnace which method provides for a reduced content of the metal to be recovered by the method in the layer of slag.

Another object of the invention is to provide a suspension smelting furnace such as a flash smelting furnace or a flash converting furnace which suspension smelting furnace provides for a reduced content of the metal to be recovered in the layer of slag.

Short Description of the Invention

The method is based on using a suspension smelting furnace having a settler that extends in two directions from the landing zone for the jet of oxidized suspension below the reaction shaft so that the settler comprises 1) a first settler part in the settler where the oxygen content and the temperature is lower than in another part of the settler and 2) a second settler part that is formed by said other part of the settler.

Correspondingly, the suspension smelting furnace has a settler that extends in two directions from the landing zone for the jet of oxidized suspension below the reaction shaft so that the settler comprises 1) a first settler part in the settler where the oxygen content and the temperature is lower than in another part of the settler, and 2) a second settler part that is formed by said other part of the settler.

The oxygen content is lower in the first settler part than in the second settler part because of the flow of process gases flowing in the second settler part from the reaction shaft to the uptake shaft. This flow of process gases contains oxygen originating for example from the reaction gases that is fed into the reaction shaft by means of the concentrate burner and from air leakages in the structure of the settler of the suspension smelting furnace. This oxygen oxidizes for example particles and dust in the process gases and oxidized particles will land on the melt in the settler and increase the level of oxidization of at least the layer of slag. Additionally, dust and oxidized dust that stick to the inner walls of the uptake shaft will occasionally detach from the inner walls of the uptake shaft and fall down onto the surface of the melt and increase the level of oxidization of at least the layer of slag. Fine particles will be more oxidized than large particles in the reaction shaft. These fine particles will settle further in the slag zone, between the landing zone and the uptake shaft. This phenomenon will increase oxygen content in the slag near the uptake shaft.

Additionally, the temperature is lower in the first settler part than in the second settler part because of the flow of hot process gases flowing in the second settler part from the reaction shaft to the uptake shaft. This lower temperature in the first settler part will result in less amount of copperoxide ($Cu_2O$) and coppersulfide ($Cu_2S$) in the first settler part.

The first settler part can be considered to form a reduction section of the settler and the second settler part can be considered to form an oxidizing section of the settler.

Because the oxygen content is lower in the first settler part than in the second settler part, less magnetite ($Fe_3O_4$) will be will be formed at low temperatures in the slag the first settler part than in the slag in the second settler part. Less magnetite in the part of the slag layer that is in the first settler part means that the viscosity of the part of the slag layer that is in the first settler part will be low and that droplets of matte or crude metal therefore can easier flow down in the part of the slag layer in the first settler part to the layer of matte or crude metal below the slag layer.

The first settler part will have lower coppersulfide ($Cu_2S$) and copperoxide ($Cu_2O$) in equilibrium with the slag and lower viscosity, which will result in lower copper in slag. The second settler part has higher oxygen potential, which increases matte grade. For these reasons slag is tapped from first settler part and matte from the second settler part of the suspension smelting furnace.

In a traditional suspension smelting furnace, such as in a suspension smelting furnace as disclosed in Finnish patent 22694, the end of the settler wall that is closer to the reaction shaft wears a lot, because of the closeness of the reaction shaft, which is the hottest part of the settler. In a suspension smelting furnace according to the invention, the end wall of the settler is located at a distance from this hottest part of the settler and thus the wear will not be an issue.

In an embodiment of the invention, the second taphole for discharging matte from the settler is located in the uptake shaft end, in the end of the second settler part. An advantage with this embodiment is that the second taphole will be situated in the area, where lots of oxidic or oxidized material falls on the slag layer, and so matte grade will become higher. Another advantage with this embodiment is that matte grade fluctuations will be smaller compared to the tapping alongside of the settler wall. Yet another advantage with this embodiment is that matte buildup in the bottom of the settler will be smaller.

In an embodiment of the invention the distance between the reaction shaft and the uptake shaft is less than 10 m, preferably less than 4 m. An advantage with such arrangement is that the buildup tendency in the uptake shaft end of the settler, i.e. in the second settler part, is smaller as hot reaction shaft gases will not be cooled down in the long settler as in a traditional suspension smelting furnace, such as in a suspension smelting furnace as disclosed in Finnish patent 22694.

LIST OF FIGURES

In the following the invention will described in more detail by referring to the figures of which

DETAILED DESCRIPTION OF THE INVENTION

The figures show examples of various suspension smelting furnaces suitable for carrying out various embodiments of the method and various embodiments of the suspension smelting furnace.

First the method for producing matte or crude metal in a suspension smelting furnace such as a flash smelting furnace or a flash converting furnace and preferred embodiments of the method and variants of the method will be described in greater detail.

The method comprises a step for feeding sulfidic raw material containing metal 1, slag-forming agent 2 and oxygen containing reaction gas 3 by means of a concentrate burner 4 into a reaction shaft 5 of the suspension smelting furnace to form a jet of oxidized suspension 6 in the reaction shaft 5.

In case the suspension smelting furnace is a flash smelting furnace, the sulfidic raw material containing metal 1 can for example be sulfidic non-ferrous concentrate such as sulfidic copper concentrate or sulfidic nickel concentrate.

In case the suspension smelting furnace is a flash converting furnace, the sulfidic raw material containing metal 1 can for example be copper matte obtained from a flash smelting process performed in a flash smelting furnace.

The slag forming agent can contain silica and/or calcium bearing material, such as lime or limestone.

The oxygen containing reaction gas 3 can for example be air or oxygen-enriched air.

The method comprises additionally a step for receiving the jet of oxidized suspension 6 in a landing zone 7 of a settler 8 in communication with a lower end (not marked with a reference numeral) of the reaction shaft 5. The settler 8 has an inner space 9 limited by a wall structure (not marked with a reference numeral), a bottom structure (not marked with a reference numeral) and a roof structure (not marked with a reference numeral). The settler 8 has a first end wall structure 27 at one end of the settler 8 and a second end wall structure 28 at the opposite end of the settler 8.

The method comprises additionally a step for forming a layer of matte or crude metal 10 and a layer of slag 11 on top of the layer of matte or crude metal 10 in the settler 8. In case the suspension smelting furnace is a flash smelting furnace, a layer of matte 10 is formed in the settler 8, and in case the suspension smelting furnace is a flash converting furnace, a layer of crude metal 10 is formed in the settler 8.

The method comprises additionally a step for leading process gases 12 produced in the suspension smelting process in the suspension smelting furnace from the suspension smelting furnace via an uptake shaft 13, wherein the uptake shaft 13 has a lower end in communication with the settler 8.

The method comprises additionally a first discharging step for discharging slag 14 from the layer of slag 11 in the settler 8 through a first taphole 15.

The method comprises additionally a second discharging step for discharging matte or crude metal 16 from the layer of matte or crude metal 10 in the settler 8 through a second taphole 17, wherein the first taphole 15 is arranged in the vertical direction at a level above the second taphole 17.

The method comprises providing for the method, a suspension smelting furnace having a settler 8 extending in two opposite directions from the landing zone 7 for the jet of oxidized suspension 6 below the reaction shaft 5 in the settler 8 so that the settler 8 comprises a first settler part 18 on a first side of the landing zone 7 and a second settler part 19 on an opposite second side of the landing zone 7, and so that a lower end of the uptake shaft 13 is in communication with the inner space 9 of the settler 8 via the second settler part 19.

The first discharging step for discharging slag 14 from the layer of slag 11 in the settler 8 is performed by discharging slag 14 from the layer of slag 11 in the settler 8 through a first taphole 15 arranged in the first settler part 18.

The second discharging step for discharging matte or crude metal 16 from the layer of matte or crude metal 10 in the settler 8 is performed by discharging matte or crude metal 16 from the layer of matte or crude metal 11 through a second taphole 17 arranged in the second settler part 19.

Figure 1:
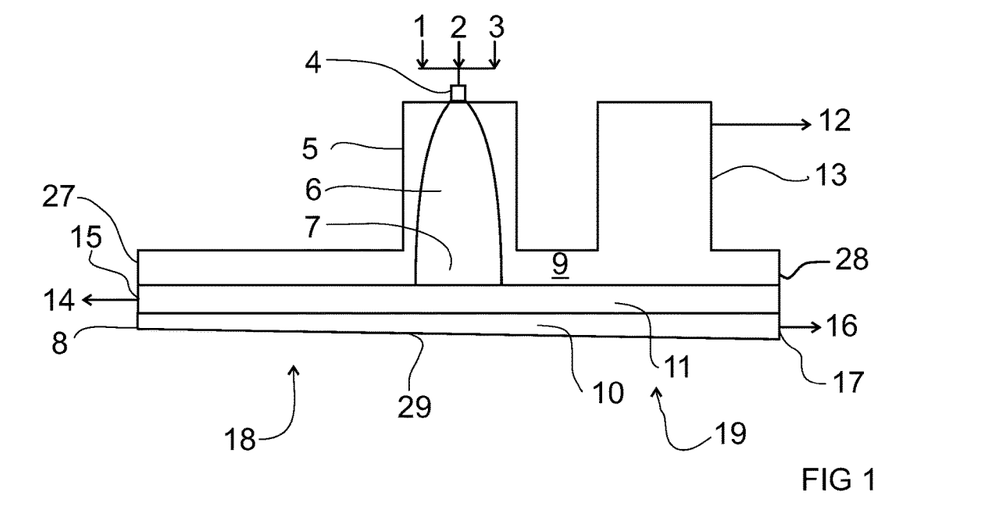
FIG. 1 is a schematic illustration of a suspension smelting furnace according to a first embodiment.
Figure 2:
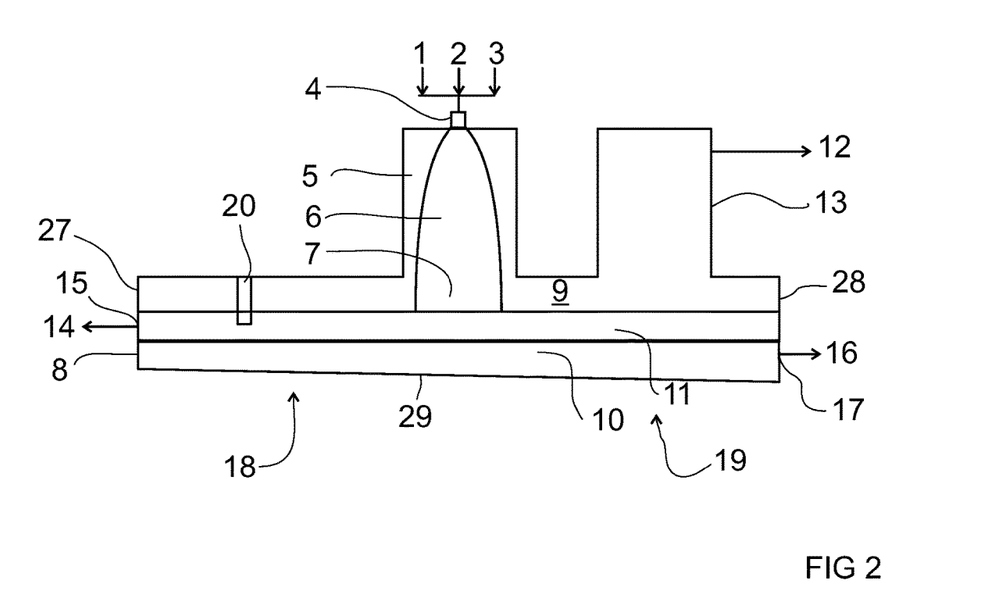
FIG. 2 is a schematic illustration of a suspension smelting furnace according to a second embodiment.
Figure 3:
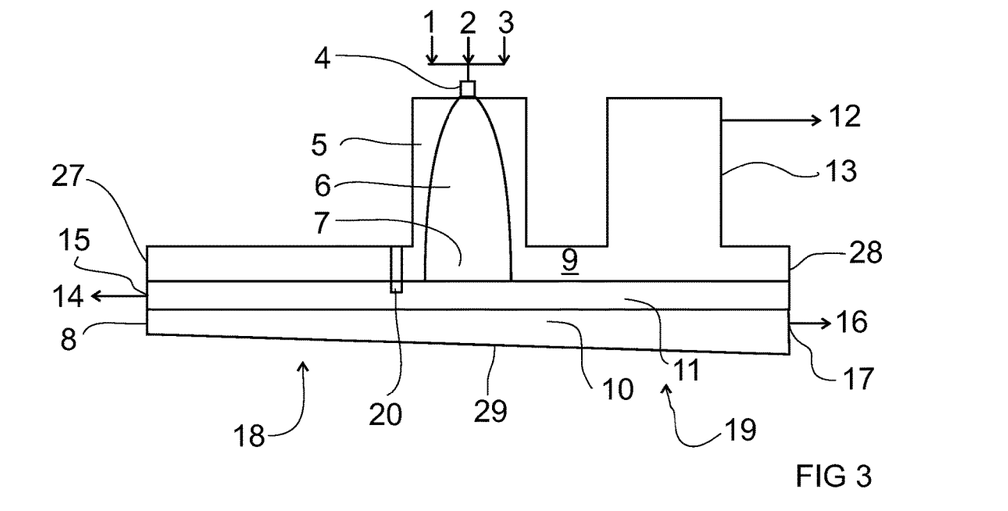
FIG. 3 is a schematic illustration of a suspension smelting furnace according to a third embodiment.
Figure 4:
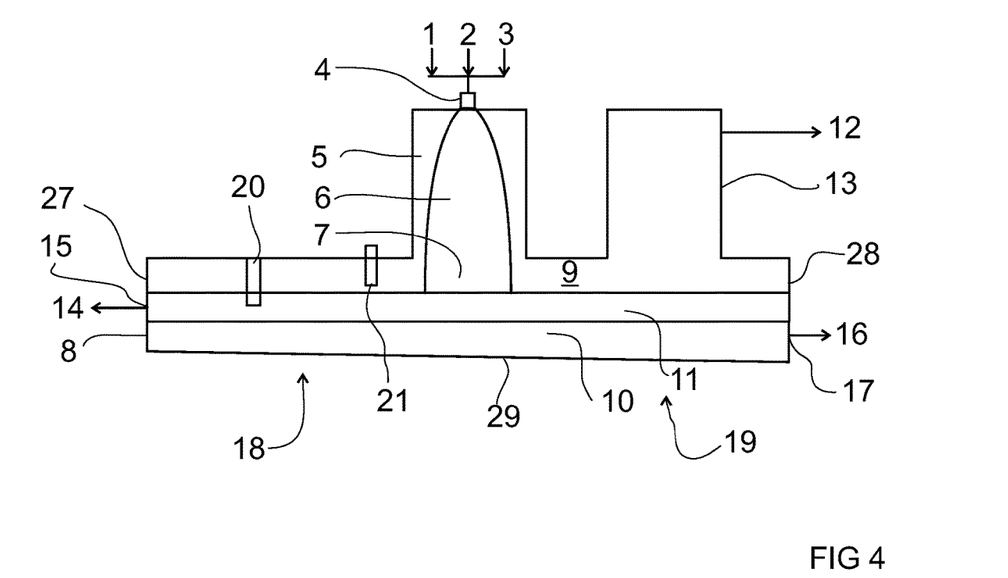
FIG. 4 is a schematic illustration of a suspension smelting furnace according to a fourth embodiment.
Figure 5:
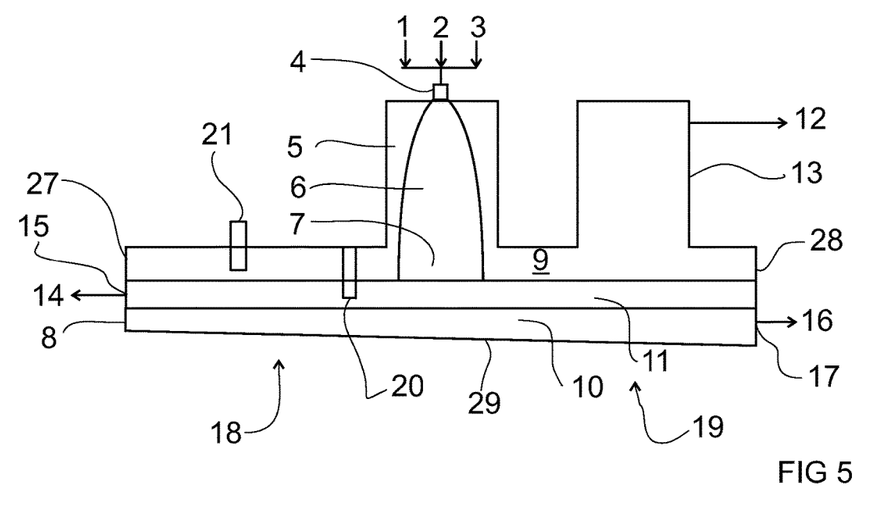
FIG. 5 is a schematic illustration of a suspension smelting furnace according to a fifth embodiment.
Figure 6:
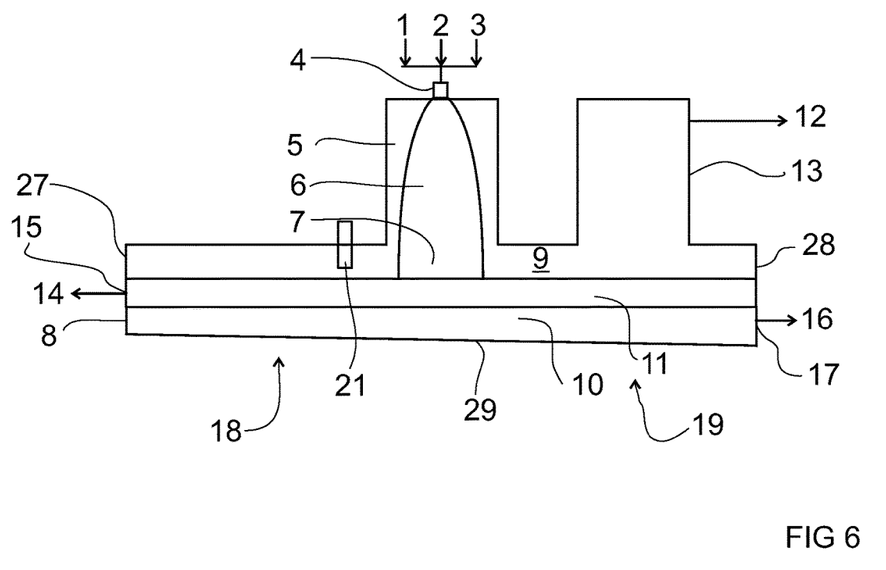
FIG. 6 is a schematic illustration of a suspension smelting furnace according to a sixth embodiment
Figure 7:
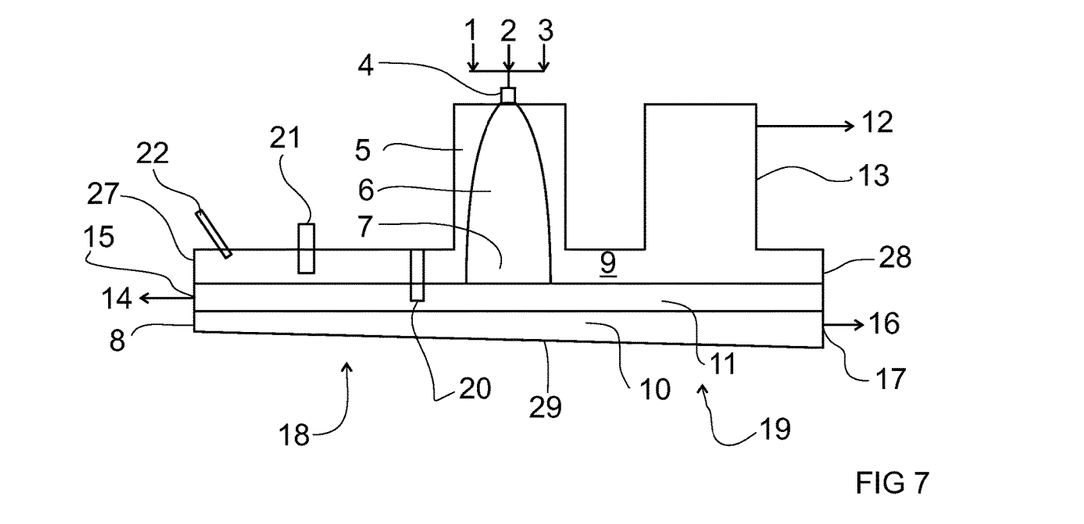
FIG. 7 is a schematic illustration of a suspension smelting furnace according to a seventh embodiment.
Figure 8:
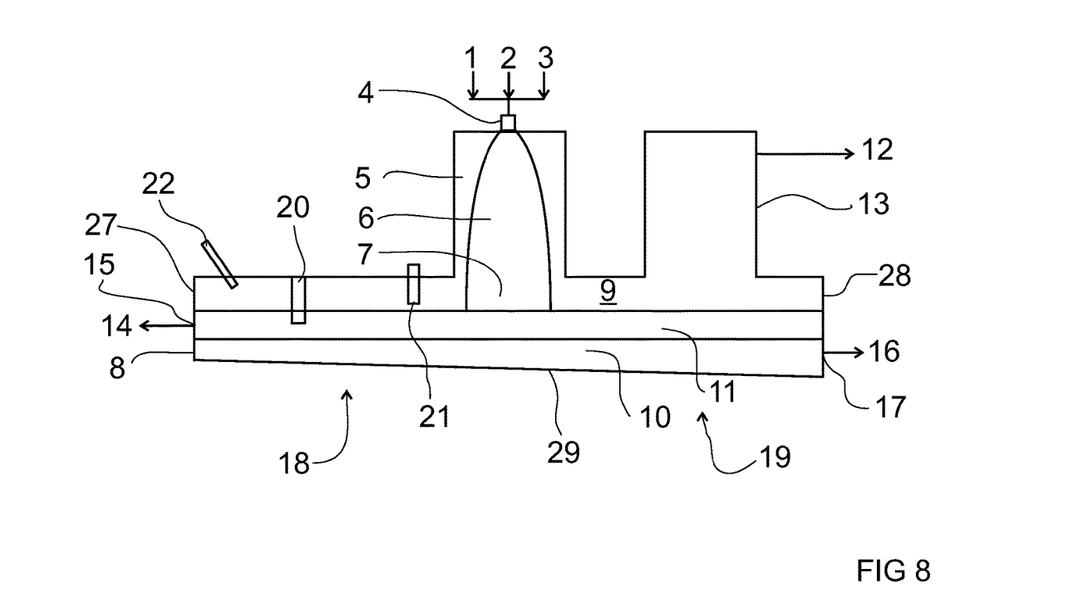
FIG. 8 is a schematic illustration of a suspension smelting furnace according to a eight embodiment.

The method may comprise a providing step for providing the first settler part 18 with a partition baffle 20 for preventing oxidized dust created in the suspension smelting furnace from entering at least a section of the first settler part 18 so that the partition baffle 20 extending from a roof of the first settler part 18 downwards into the first settler part 18. FIGS. 2 to 5 and 7 and 8 shows suspension smelting furnaces in which the first settler part 18 has been provided with such partition baffle 20. As is shown in FIGS. 2 to 5 and 7 and 8, the position of such partition baffle 20 can be close to the reaction shaft 5 as is shown in FIGS. 3, 5 and 7, or alternatively more to the middle of the first settler part 18 as is shown in FIGS. 2, 4 and 8. If the method comprises such providing step, the method comprises additionally forcing slag from the layer of slag 11 downwards in the first settler part 18 by means of the partition baffle 20.

The method may comprise a providing step for providing the first settler part 18 with reducing agent feeding means 21 for feeding reducing agent into at least one of the layer of matte or crude metal 10 and the layer of slag 11. FIGS. 4 to 8 shows suspension smelting furnaces in which the first settler part 18 has been provided with such reducing agent feeding means 21. If the method comprises such providing step, the method comprises additionally feeding reducing agent in the form of solid and/or gas such as natural gas into at least one of the layer of matte or crude metal 10 and the layer of slag 11 by means of the reducing agent feeding means 21.

The method may comprise a providing step for providing the first settler part 18 with a burner 22 for creating a reducing atmosphere in at least a section of the first settler part 18. FIGS. 7 and 8 shows suspension smelting furnaces in which the first settler part 18 has been provided with such burner 22. If the method comprises such providing step, the method comprises additionally using the burner 22 for creating a reducing atmosphere in at least a section of the first settler part 18 for example by consuming oxygen present in the first settler part 18 in the burning process performed with the burner 22.

The method comprises preferably, but not necessarily, as shown in the figures forming a layer of matte or crude metal 10 of at least one of sulfidic raw material containing metal 1, slag-forming agent 2 and oxygen containing reaction gas 3 fed by the concentrate burner 4 extending in a horizontal dimension over the whole inner space 9 of the settler 8, and forming a layer of slag 11 of at least one of sulfidic raw material containing metal 1, slag-forming agent 2 and oxygen containing reaction gas 3 fed by the concentrate burner 4 extending in a horizontal dimension over the whole inner space 9 of the settler 8.

The method comprises preferably, but not necessarily, providing for the method a suspension smelting furnace having distance between the reaction shaft 5 and the uptake shaft 13 less than 10 m, preferably less than 4 m. if the reaction shaft 5 and the uptake shaft 13 are situated in this manner relatively close to each other, dust that has attached to the inner walls of the uptake shaft 13 will fall down from the uptake shaft 13 close to the reaction shaft 5 and an advantage of this is that because the temperature of the melt is high close to the reaction shaft 5, the dust will better blend in into the melt.

The method comprises preferably, but not necessarily, providing for the method a suspension smelting furnace where the inner space 9 of the settler 8 is in communication with the lower end of the reaction shaft 5 at a point of the settler 8 that is closer to the middle of the settler 8 than one of the ends of the settler 8. This provides for both a large first settler part 18 and a large second settler part 19. The figures show suspension smelting furnaces where the reaction shaft 5 is situated at the middle of the settler 8.

The method comprises preferably, but not necessarily, providing for the method a suspension smelting furnace having a settler 8 having an elongated configuration, as is shown in the figures.

The method comprises preferably, but not necessarily, as is shown in the figures, providing for the method a suspension smelting furnace having a first settler part 18 having a first proximal end (not marked with a reference numeral) at the landing zone 7 and first distal end (not marked with a reference numeral) at the opposite end of the first settler part 18, which first distal end also is the first end wall structure 27 of the settler 8, and having the first taphole 15 for discharging slag 14 from the settler 8 arranged at the first distal end of the first settler part 18.

The method comprises preferably, but not necessarily, as is shown in the figures, providing for the method a suspension smelting furnace the second settler part 19 having a second proximal end (not marked with a reference numeral) at the landing zone 7 and second distal end (not marked with a reference numeral) at the opposite end of the second settler part 19 which second distal end also is the second end wall structure 28 of the settler 8, and having the second taphole 17 for discharging matte of crude metal from the settler 8 arranged at the second distal end of the second settler part 19.

Figure 9:
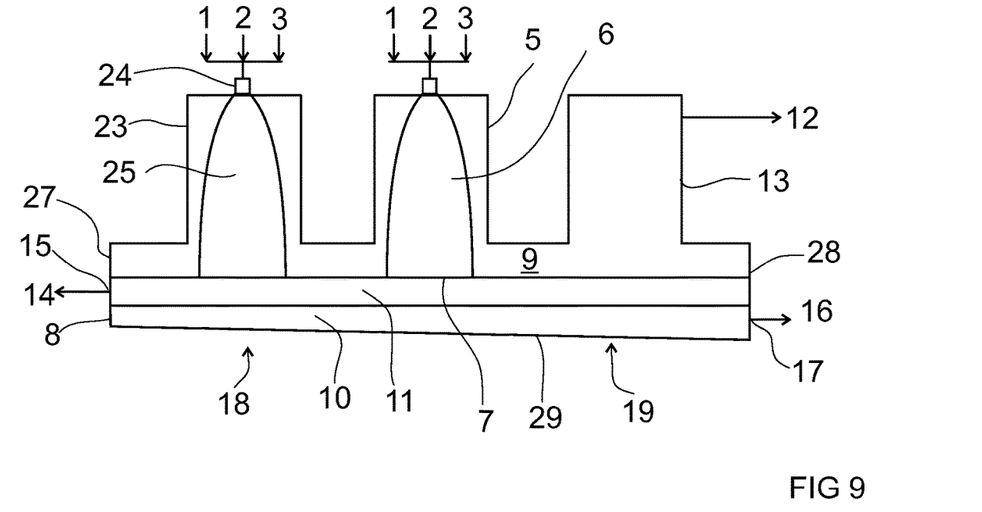
FIG. 9 is a schematic illustration of a suspension smelting furnace according to a ninth embodiment.

The method may, as shown in FIG. 9, comprise a providing step for providing for the method a suspension smelting furnace provided with an additional reaction shaft 23 having a lower end in communication with a first inner space (not marked with a reference numeral) of the first settler part 18, wherein the additional reaction shaft being provided with an additional concentrate burner 24 for feeding sulfidic raw material containing metal 1, slag-forming agent 2 and oxygen containing reaction gas 3 into the additional reaction shaft 23 to form an additional jet 25 of oxidized suspension in the additional reaction shaft 23. If the method comprises such providing step, the method comprises feeding a feed of sulfidic raw material containing metal 1, slag-forming agent 2 and oxygen containing reaction gas 3 by means of the additional concentrate burner 24 than with the concentrate burner 4 so said feed comprises a smaller oxygen coefficient (total oxygen content for feed) than the oxygen coefficient of the corresponding feed that is fed into the reaction shaft 5 by means of the concentrate burner 4. A such feed into the additional reaction shaft 23 will lower the temperature of the slag in the first inner space of the first settler part 18 resulting in lower matte grade and therefore lower oxygen potential in the slag, which means lower $Cu_2S$ and $Cu_2O$ in equilibrium with the slag. Also lower magnetite content of the slag will decrease slag viscosity. Droplets of matte or crude metal therefore can easier flow down in the part of the slag layer in the first inner space of the first settler part 18 to the layer of matte or crude metal below the slag layer.

Figure 10:
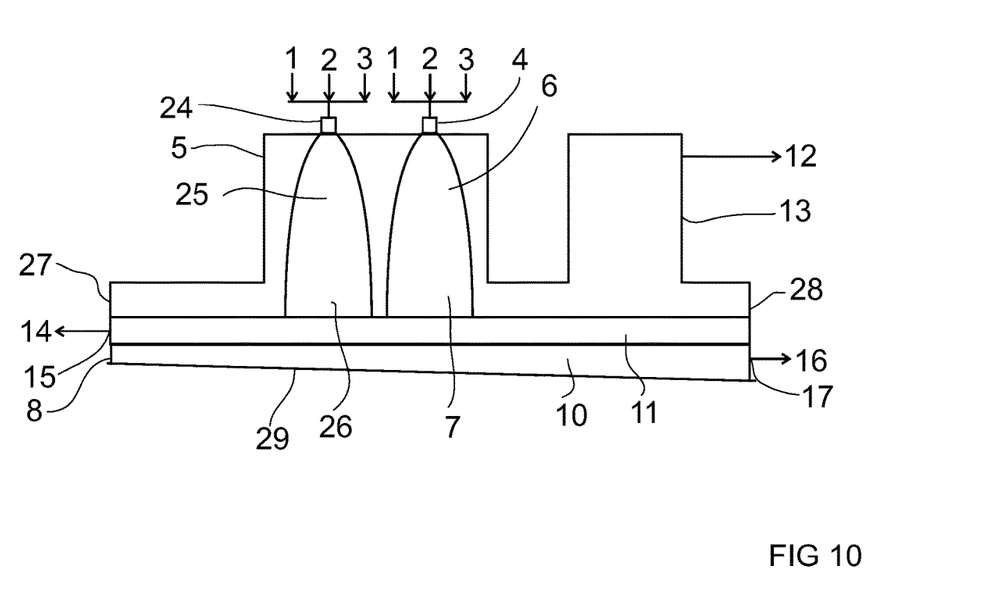
FIG. 10 is a schematic illustration of a suspension smelting furnace according to a tenth embodiment.

The method may, as shown in FIG. 10, comprise a providing step for providing for the method a suspension smelting furnace provided a suspension smelting furnace having reaction shaft 5 being provided in addition to a concentrate burner 4 with an additional concentrate burner 24 for feeding sulfidic raw material containing metal 1, slag-forming agent 2 and oxygen containing reaction gas 3 into the reaction shaft 5 to form an additional jet 25 of oxidized suspension in the reaction shaft 5. If the method comprises such providing step, the method comprises feeding a feed of sulfidic raw material containing metal 1, slag-forming agent 2 and oxygen containing reaction gas 3 by means of the additional concentrate burner 24 than with the concentrate burner 4 so said feed comprises a smaller oxygen coefficient (total oxygen content for feed) than the oxygen coefficient of the corresponding feed that is fed into the reaction shaft 5 by means of the concentrate burner 4. If the method comprises such providing step, the method comprises preferably, but not necessarily, receiving the additional jet 25 of oxidized suspension in an additional landing zone 26 of the inner space 9 of the settler 8 in communication with the reaction shaft 5, which additional landing zone being formed closer to the first settler part 18 than the second settler part 19. A such feed into the reaction shaft 5 will lower the temperature of the slag flowing into the first inner space of the first settler part 18 resulting in lower matte grade and therefore lower oxygen potential in the slag, which means lower $Cu_2S$ and $Cu_2O$ in equilibrium with the slag. Also lower magnetite content of the slag will decrease slag viscosity. Droplets of matte or crude metal therefore can easier flow down in the part of the slag layer in the first inner space of the first settler part 18 to the layer of matte or crude metal below the slag layer.

The method comprises preferably, but not necessarily, leading process gases 12 from the suspension smelting furnace via the uptake shaft 13 by sucking.

The method may comprise providing for the method a suspension smelting furnace having the first taphole 15 arranged in the first end wall structure 27 of the settler 8.

The method may comprise providing for the method a suspension smelting furnace having the second taphole 17 arranged in the second end wall structure 28 of the settler 8.

The method may comprise providing for the method a suspension smelting furnace having a settler 8 provided with a bottom structure 29 that slopes downwardly for example in an inclined and/or curved manner towards the second taphole 16.

The method may comprise providing for the method a suspension smelting furnace having a settler 8 provided with a bottom structure 29 that slopes downwardly for example in an inclined and/or curved manner towards the second taphole 16 between the first end wall structure 27 of the settler 8 and the second end wall structure 28 of the settler 8.

The method may comprise providing for the method a suspension smelting furnace having a settler 8 provided with a bottom structure 29 that slopes downwardly for example in an inclined and/or curved manner towards the second taphole (16) from the first wall structure 27 of the settler 8 to the second end wall structure 28 of the settler 8.

Next the suspension smelting furnace such as a flash smelting furnace or a flash converting furnace and preferred embodiments of the suspension smelting furnace and variants of the suspension smelting furnace will be described in greater detail.

The suspension smelting furnace comprises a reaction shaft 5 provided with a concentrate burner 4 for feeding sulfidic raw material containing metal 1, slag-forming agent 2 and oxygen containing reaction gas 3 into the reaction shaft 5 to form a jet of oxidized suspension 6 in the reaction shaft 5.

In case the suspension smelting furnace is a flash smelting furnace, the sulfidic raw material containing metal 1 can for example be sulfidic non-ferrous concentrate such as sulfidic copper concentrate.

In case the suspension smelting furnace is a flash converting furnace, the sulfidic raw material containing metal 1 can for example be copper matte obtained from a flash smelting process performed in a flash smelting furnace.

The slag forming agent can contain silica and/or calcium bearing material, such as lime or limestone.

The oxygen containing reaction gas 3 can for example be air or oxygen-enriched air.

The suspension smelting furnace comprises additionally a settler 8 in communication with a lower end of the reaction shaft 5. The settler 8 comprises an inner space 9 and a first end wall structure 27 at one end of the settler 8 and a second end wall structure 28 at the opposite end of the settler 8. A landing zone 7 for the jet of oxidized suspension 6 is formed in the inner space 9 of the settler 8 below the lower end of the reaction shaft 5. The settler 8 is configured to receive oxidized suspension 6 from the reaction shaft 5 at the landing zone 7 and to form a layer of matte or crude metal 10 and a layer of slag 11 on top of the layer of matte or crude metal 10 in the inner space 9 of the settler 8.

The suspension smelting furnace comprises additionally an uptake shaft 13 for leading process gases 12 from the suspension smelting furnace via the uptake shaft 13. The uptake shaft 13 has a lower end in communication with the settler 8.

The suspension smelting furnace comprises additionally a first taphole 15 for discharging slag 14 from the layer of slag 11 in the inner space 9 of the settler 8.

The suspension smelting furnace comprises additionally a second taphole 17 for discharging matte or crude metal 16 from the layer of matte or crude metal 10 in the inner space 9 of the settler 8.

The first taphole 15 for discharging slag 14 from the layer of slag 11 in the inner space 9 of the settler 8 is arranged in the vertical direction at a level above the second taphole 17 for discharging matte or crude metal 16 from the layer of matte or crude metal 10 in the inner space 9 of the settler 8.

The settler 8 extends in two opposite directions from the landing zone 7 for the jet of oxidized suspension 6 below the reaction shaft 5 in the settler 8 so that the settler 8 comprises a first settler part 18 on a first side of the landing zone 7 and a second settler part 19 on an opposite second side of the landing zone 7.

The first taphole 15 for discharging slag 14 from the layer of slag 11 in the settler 8 is arranged in the first settler part 18.

The second taphole 17 for discharging matte or crude metal 16 from the layer of matte or crude metal 10 in the settler 8 is arranged in the second settler part 19.

The lower end of the uptake shaft 13 is in communication with the inner space 9 of the settler 8 via the second settler part 19.

The first settler part 18 may, as is shown in FIGS. 2 to 5 and 7 and 8, be provided with a partition baffle 20 for preventing oxidized dust from entering at least a section of the first settler part 18. The partition baffle 20 extends from a roof of the first settler part 18 downwards into the first settler part 18, forcing slag from the layer of slag 11 downwards in the settler 8 by means of the partition baffle 20.

The first settler part 18 may, as is shown in FIGS. 4 to 8, be provided with reducing agent feeding means 21 for feeding reducing agent into at least one of the layer of matte or crude metal 10 and the layer of slag 11.

The first settler part 18 may, as is shown in FIGS. 7 and 8, be provided a burner 22 for creating a reducing atmosphere in at least a section of the first settler part 18. A purpose of the burner 22 is to create a reducing atmosphere in at least a section of the first settler part 18 by consuming oxygen present in the first settler part 18 in the burning process performed with the burner 22

In the suspension smelting furnace, the layer of matte or crude metal 10 formed of at least one of sulfidic raw material containing metal 1, slag-forming agent 2 and oxygen containing reaction gas 3 fed by the concentrate burner 4 is preferably, but not necessarily, configured to extend in a horizontal dimension over the whole inner space 9 of the settler 8, and the layer of slag 11 formed of at least one of sulfidic raw material containing metal 1, slag-forming agent 2 and oxygen containing reaction gas 3 fed by the concentrate burner 4 is preferably, but not necessarily, configured to extend in a horizontal dimension over the whole inner space 9 of the settler 8.

In the suspension smelting furnace the distance between the reaction shaft 5 and the uptake shaft 13 is preferably, but not necessarily, less than 10 m, preferably less than 5 m.

In the suspension smelting furnace the inner space 9 of the settler 8 is preferably, but not necessarily, in communication with the lower end of the reaction shaft 5 at a point of the settler 8 that is closer to the middle of the settler 8 than one of the ends of the settler 8.

The settler 8 of the suspension smelting furnace has preferably, but not necessarily, an elongated configuration.

The first settler part 18 has preferably, but not necessarily, a first proximal end at the landing zone 7 and first distal end at the opposite end of the first settler part 18 which first distal end also is the first end wall structure 27 of the settler 8, and the first taphole 15 for discharging slag 14 from the settler 8 is preferably, but not necessarily, arranged at such first distal end of the first settler part 18.

The second settler part 19 has preferably, but not necessarily, a second proximal end at the landing zone 7 and second distal end at the opposite end of the second settler part 19 which second distal end also is the second end wall structure 28 of the settler 8, and second taphole 17 for discharging matte of crude metal from the settler 8 is preferably, but not necessarily, arranged at the second distal end of the second settler part 19.

The suspension smelting furnace may, as is shown in FIG. 9, have an additional reaction shaft 23 having a lower end in communication with the first settler part 18. The additional reaction shaft 23 being provided with an additional concentrate burner 24 for feeding sulfidic raw material containing metal 1, slag-forming agent 2 and oxygen containing reaction gas 3 into the additional reaction shaft 23 to form an additional jet 25 of oxidized suspension in the additional reaction shaft 23.

The reaction shaft 5 of the suspension smelting furnace may, as is shown in FIG. 10, be provided in addition to a concentrate burner with an additional concentrate burner 24 for feeding sulfidic raw material containing metal 1, slag-forming agent 2 and oxygen containing reaction gas 3 into the reaction shaft 5 to form an additional jet 25 of oxidized suspension in the reaction shaft 5. If the reaction shaft 5 of the suspension smelting furnace is provided with such additional concentrate burner 24, the settler 8 comprises preferably, but not necessarily, an additional landing zone for the additional jet 25 of oxidized suspension so that the additional landing zone is formed closer to the first settler part 18 than the second settler part 19.

The suspension smelting furnace is preferably, but not necessarily, provided with sucking means leading process gases 12 from the suspension smelting furnace by sucking.

The first taphole 15 may be arranged in the first end wall structure 27 of the settler 8.

The second taphole 17 may be arranged in the second end wall structure 28 of the settler 8.

The settler 8 may be provided with a bottom structure 29 that slopes downwardly for example in an inclined and/or curved manner towards the second taphole 16.

The settler 8 may be provided with a bottom structure 29 that slopes downwardly for example in an inclined and/or curved manner towards the second taphole 16 between the first end wall structure 27 of the settler 8 and the second end wall structure 28 of the settler 8.

The settler 8 may be provided with a bottom structure 29 that slopes downwardly for example in an inclined and/or curved manner towards the second taphole 16 from the first wall structure 27 of the settler 8 to the second end wall structure 28 of the settler 8.

It is apparent to a person skilled in the art that as technology advances, the basic idea of the invention can be implemented in various ways. The invention and its embodiments are therefore not restricted to the above examples, but they may vary within the scope of the claims.

The invention claimed is:

1. Suspension smelting furnace, comprising:
   a reaction shaft provided with a concentrate burner for feeding sulfidic raw material containing metal, slag-forming agent and oxygen containing reaction gas into the reaction shaft to form a jet of oxidized suspension in the reaction shaft,
   a settler in communication with a lower end of the reaction shaft wherein the settler has an elongated configuration,
   wherein the settler comprises an inner space and a first end wall structure at one end of the settler and a second end wall structure at the opposite end of the settler and wherein a landing zone for the jet of oxidized suspension is formed in the inner space of the settler below the lower end of the reaction shaft and wherein the settler is configured to receive oxidized suspension from the reaction shaft at the landing zone and to form a layer of matte or crude metal, wherein the layer of matte or crude metal extends in a horizontal dimension over the whole inner space of the settler, and a layer of slag on top of the layer of matte or crude metal in the inner space of the settler, wherein the layer of slag extends in a horizontal dimension over the whole inner space of the settler,
   an uptake shaft for leading process gases from the suspension smelting furnace via the uptake shaft, wherein the uptake shaft has a lower end in communication with the settler,
   a first taphole for discharging slag from the layer of slag in the inner space of the settler, and
   a second taphole for discharging matte or crude metal from the layer of matte or crude metal in the inner space of the settler, wherein the first taphole is arranged in the vertical direction at a level above the second taphole, wherein
   the settler extends in two opposite directions from the landing zone for the jet of oxidized suspension below the reaction shaft in the settler so that the settler comprises a first settler part on a first side of the landing zone, wherein the first settler part has a first proximal end at the landing zone and a first distal end at the opposite end of the first settler part which first distal end also is the first end wall structure of the settler, and a second settler part on an opposite second side of the landing zone, wherein the second settler part has a second proximal end at the landing zone and a second distal end at the opposite end of the second settler part which second distal end also is the second end wall structure of the settler,
   the settler is provided with a bottom structure that slopes continuously downwardly towards the second taphole from the first end wall structure of the settler to the second end wall structure of the settler,
   by the first taphole for discharging slag from the layer of slag in the settler being arranged in the first end wall structure,
   by the second taphole for discharging matte or crude metal from the layer of matte or crude metal in the settler being arranged in the second end wall structure, and
   by the lower end of the uptake shaft being in communication with the settler via the second settler part.

2. The suspension smelting furnace according to claim 1, wherein the first settler part is provided with a partition baffle for preventing oxidized dust from entering at least a section of the first settler part, wherein the partition baffle extends from a roof of the first settler part downwards into the first settler part.

3. The suspension smelting furnace according to claim 1, wherein the first settler part is provided with reducing agent feeding means for feeding reducing agent into at least one of the layer of matte or crude metal and the layer of slag.

4. The suspension smelting furnace according to claim 1, wherein the first settler part is provided a burner for creating a reducing atmosphere in at least a section of the first settler part.

5. The suspension smelting furnace according to claim 1, wherein the distance between the reaction shaft and the uptake shaft is less than 10 m.

6. The suspension smelting furnace according to claim 1, wherein the inner space of the settler is in communication with the lower end of the reaction shaft at a point of the settler that is closer to the middle of the settler than one of the ends of the settler.

7. The suspension smelting furnace according to claim 1, wherein
   an additional reaction shaft has a lower end in communication with the first settler part, and
   the additional reaction shaft is provided with an additional concentrate burner for feeding sulfidic raw material containing metal, slag-forming agent and oxygen containing reaction gas into the additional reaction shaft to form an additional jet of oxidized suspension in the additional reaction shaft.

8. The suspension smelting furnace according to claim 1, wherein
   the reaction shaft is provided in addition to a concentrate burner with an additional concentrate burner for feeding sulfidic raw material containing metal, slag-forming agent and oxygen containing reaction gas into the reaction shaft to form an additional jet of oxidized suspension in the reaction shaft.

9. The suspension smelting furnace according to claim 8, wherein
   the settler comprises an additional landing zone for additional jet of oxidized suspension, and the additional landing zone is formed closer to the first settler part than the second settler part.

10. The suspension smelting furnace according to claim 1, wherein the first taphole is arranged in the first end wall structure of the settler.

11. The suspension smelting furnace according to claim 1, wherein the second taphole is arranged in the second end wall structure of the settler.

* * * * *